United States Patent
Martin et al.

(10) Patent No.: US 7,301,898 B1
(45) Date of Patent: Nov. 27, 2007

(54) CREDIT SHARING FOR FIBRE CHANNEL LINKS WITH MULTIPLE VIRTUAL CHANNELS

(75) Inventors: Kreg A. Martin, Los Gatos, TX (US); David C. Banks, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1032 days.

(21) Appl. No.: 10/207,541

(22) Filed: Jul. 29, 2002

(51) Int. Cl.
*H04L 12/26* (2006.01)

(52) U.S. Cl. .................. 370/229; 370/395.41

(58) Field of Classification Search ............... 370/232, 370/229, 235, 252, 236.1, 253, 389, 395.21, 370/395.4, 395.41, 395.42, 395.43, 373, 370/384, 224
See application file for complete search history.

(56) References Cited

U.S. PATENT DOCUMENTS 6,243,358 B1 * 6/2001 Monin ........................ 370/229
6,324,165 B1 * 11/2001 Fan et al. .................... 370/232

\* cited by examiner

*Primary Examiner*—Brenda Pham
(74) *Attorney, Agent, or Firm*—Wong, Cabello, Lutsch, Ritherford & Brucculeri, LLP (57) ABSTRACT

A method that utilizes virtual channels and a common pool of credits, controlled by a transmitter to maximize the throughput across an Inter-Switch Link in a Fibre Channel network. Each virtual channel is allocated a minimum number of credits and the remaining credits of the ISL are held in a common pool. When needs arise, the credits in the pool will be allocated or reallocated to make the best use dynamically by the transmitter.

31 Claims, 8 Drawing Sheets

☐ ■ frames

○ ● credits

CREDIT SHARING FOR FIBRE CHANNEL LINKS WITH MULTIPLE VIRTUAL CHANNELS

BACKGROUND OF THE INVENTION

1. Field of the Invention

This invention relates generally to network switching devices and more particularly to Fibre Channel switching devices and the credit sharing for Fibre Channel links with multiple virtual channels.

2. Description of the Related Art

The Fibre Channel family of standards (developed by the American National Standards Institute (ANSI)) defines a high speed communications interface for the transfer of large amounts of data between a variety of hardware systems such as personal computers, workstations, mainframes, supercomputers, storage devices and servers that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications. U.S. Pat. No. 6,160,813 to Banks et al. discloses one of the state of art Fibre Channel switch systems, which is hereby incorporated by reference.

One or more interconnected switches form a network, called a fabric, which other devices, such as mass storage devices, servers or workstations, can be connected to Any devices connecting to a fabric can communicate with any other devices connected to the fabric. A direct connection between two devices is a link. An interface on a device for connecting another device is a port. A non-switch device connecting to a fabric is a node on the network or fabric. A port on a non-switch and non-hub device is an N-port. A port on a switch may be an E-port, for connection to another switch port, an F-port, for connection to an N-port, an FL port for connection to an FC-AL loop or any combination of the above. A link between two switches is an inter-switch link (ISL).

Each port has a transmitter and a receiver. The transmitter sends out information and the receiver receives incoming information. There are buffer memories associated with each port, either the transmitter or the receiver, to temporarily store the information in transit, before the information is confirmed to be transmitted towards its destination by a switch, or to be stored or used by a device at its destination. The buffer memory can be in the actual port or, preferably, may be centralized, as shown in U.S. Pat. No. 6,160,813. The buffer memory is broken down into units. One unit of buffer memory, which can hold one frame, is represented by one buffer-to-buffer credit or one credit. A frame is a unit of information transmitted, which comprises a header portion and a payload portion. The header portion identifies the frame, including a Source Identification (SID) and a Destination Identification (DID). The payload portion contains the data being transmitted. A frame payload may be 2112 data bytes long, which, plus header, CRC, EOF totals 2148 bytes.

In the prior art, a receiver on a port is allocated a fixed amount of buffer space to temporarily store received frames, represented by a fixed number of buffer-to-buffer credits. The receiver controls the allocation of the buffer space. At the initial configuration when two switches connect, the receivers advertise to the transmitters the amount of buffer space represented by the number of credits available. The transmitters initialize their credit counters to the number of credits advertised by the receivers. Both the transmitting port and receiving port keep track of the use of the buffer space using the number of credits and credit counters. Each time a frame is received by the receiver, the frame is stored in a buffer space and the number of credits residing in the receiver is increased by one. The transmitting port keeps track of this by reducing its transmitter credit counter, which indicates how many more frames can be sent, while the receiver increments its receiver credit counter, which indicates how many frames are stored in the buffer space. Once the frame is confirmed to have been retransmitted by a transmitter on the receiving switch, or used by a device, then the buffer space is free to be used to store a new frame. At that time, a credit is returned by a transmitter on the receiving port to a receiver on the transmitting port and the receiver credit counter in the receiving port is decreased by one. When the transmitting port receives the credit, the transmitter credit counter in the transmitting port is increased by one.

Even though frames travel through the fiber optics at the speed of light, it still takes time for frames to move from one device to another. It also takes time for a device to receive a frame; process it or retransmit it; and then return a credit, i.e. a confirmation of receipt, back to the transmitting port. It takes some more time for the credit traveling through the optical fiber to reach the transmitting port. During the turn-around time between when the transmitting port sends out a frame and the transmitting port receives a credit, the transmitting port may have sent out a number of frames at its transmitting speed if the transmitting port has available credits. When the transmitting port has at least a minimum number of credits to allow the transmitting port to continue transmitting until it receives credits back from the receiving port, the effective frame transmission rate is the highest. If the transmitting port does not have that minimum number of credits, then it has to temporarily stop sending frames when all the credits are used and wait until the credits return. Due to this stoppage, the effective frame transmission rate may be substantially lower than the actual transmission rate. That minimum number of credits depends on the turn-around time and the frame transmitting speed. The longer the transmission line, or the faster the transmitting speed, the more frames that may be in transit. At a fixed transmitter speed, the more credits a port can have, the longer the transmission distance can be while the link still maintains the full effective transmitter speed.

In certain switches in the prior art, particularly those using a shared buffer space, there may be a pool of free buffer space which can be used by any ports on the switch needing additional buffer space. A receiving port requests an additional buffer from the pool and transmits an additional credit to the linked transmitting port before the frame is retransmitted from the receiving switch, thus allowing the switch to buffer an additional frame. The credits in this port-level pool are not advertised to the transmitting port. These credits are unknown to the transmitting ports and can only be utilized by the receiving port. When the frame is confirmed out of the receiver, its buffer is released and a credit is returned to the pool, thus allowing other ports on the switch to use the pool buffer space. The port-level pool would be utilized when the frames received from an upstream device are more than the frames retransmitted to a downstream device, for example when the downstream transmission speed is slower than the upstream transmission speed. Another example is when there is a blockage somewhere in the fabric, such as a device holding a loop open, so that frames cannot be delivered.

A switch may have many ports, e.g. 8, 16 or 64 ports etc., to interconnect many devices. Every device connecting through a single switch to many other devices can communicate with each one of them at the full transmission speed of a port-to-port link if there are enough credits on the ports. Two devices may be connected to two different switches and the two switches are directly connected, then the two devices can communicate with each other through the three links in series: device-to-switch, switch-to-switch (ISL) and switch-to-device. Two devices may also communicate with each other through more intermediate ISLs if the two switches they directly connect to do not share a common ISL. When more than one pair of devices communicates through the same ISL, conflicts may arise. For example, one pair of devices may utilize or hog all of the buffers, or other resources, on the ISL, blocking the other pairs of devices from utilizing the ISL.

To address this problem, Brocade Communications Systems Fibre Channel switches logically split the physical ISL into a series of virtual channels (VCs). The data flow can then be segmented among the VCs. The buffer space or credits available to the receiver is thus allocated among the VCs so that the blocking problem discussed above does not occur. Each channel will have at least some buffer space available, and so will have some ongoing data flow, albeit potentially at a reduced rate. VCs are also described in U.S. patent application Ser. No. 60/286,213, entitled "Quality of Service Using Virtual Channel Translation," by David C. Banks and Alex Wang, filed Apr. 24, 2001, which is hereby incorporated by reference.

In some prior art switches, the buffer space allocation among the VCs has been fixed. The fixed VC credit allocation may result in performance problems, though not as severe as would be present without the use of VCs. If a VC is not in use, then the buffer space allocated to it by the receiver or the credits advertised by the receiver for this VC to the transmitter will not be used. The VCs in use may have their effective transmission rates reduced substantially due to the lack of credits.

Besides allocating all credits to VCs as in some prior art switches, in short distance applications, a receiving port may reserve some credits in a pool, a VC-level pool, available to any of the VCs in the port and evenly allocate the remaining credits to VCs. These credits in the pool are not advertised to the transmitter. When a VC in use is busy, a credit from the pool may be returned to the transmitting port before a buffer for a frame for the VC is released, i.e. ready to be used by next frame. This effectively increases the credits available for a particular VC in use and reduces credits available for a VC not in use. These credits may also be used to smooth the frame/credit flow due to frame traffic congestion, blockage etc. While the VC level pool on a receiver may provide many benefits, it has a big drawback. Due to the reserved credits in the pool, there are less credits advertised overall and less credits advertised for each individual VC to a transmitting port, so the distance concerns are actually exacerbated.

While VCs in the prior art are very beneficial in many situations, they do not help in many long distance situations. As noted above, the VC-level credit pooling actually makes the long distance problem worse. Basically the long distance problem of the prior art is that a receiver must advertise a minimum number of credits, otherwise, the transmitter has to stop sending frame and wait periodically between the time it uses up all the advertised credit until it receives a returned credit. The more credits advertised to a transmitter, the less the long distance problem. The more credits actually available to a transmitter, the less the long distance problem. If the credits advertised or available to a transmitter are less than the needed minimum, the effective transmission rate drops substantially, as described above. The use of VCs, and to a greater extent VCs with a credit pool, actually reduces the total credits available to a transmitting port and the credits available to VCs. This long distance problem is illustrated in more detail below.

This problem could be resolved by providing additional buffer space for each receiver, but in many cases the additional buffer space would not be utilized, thus wasting scarce resources on the ASICs which comprise the receivers. Therefore, it is desirable to reduce the long distance problem but at the same time conserve ASIC resources. It is also desirable not to cause new problems.

SUMMARY OF THE INVENTION

The present invention utilizes virtual channels and a common pool of credits to maximize the efficiency and throughput across an ISL. The control and management of the credits available on a receiver is transferred to a transmitter from a receiver during the initial port connection and configuration. Only the total credits on the receiver, not the credits for each of the VCs, are advertised by the receiver to the transmitter. Each virtual channel is allocated a minimum number of credits and the remaining credits of the ISL are held in a common pool for all the virtual channels in the ISL by the transmitter. When needs arise, the transmitter allocates or reallocates the credits in the pool among the virtual channels to make the best use dynamically.

BRIEF DESCRIPTION OF THE DRAWINGS

A better understanding of the invention can be had when the following detailed description of the preferred embodiments is considered in conjunction with the following drawings, in which.

DESCRIPTION OF THE PREFERRED EMBODIMENT

Figure 1:
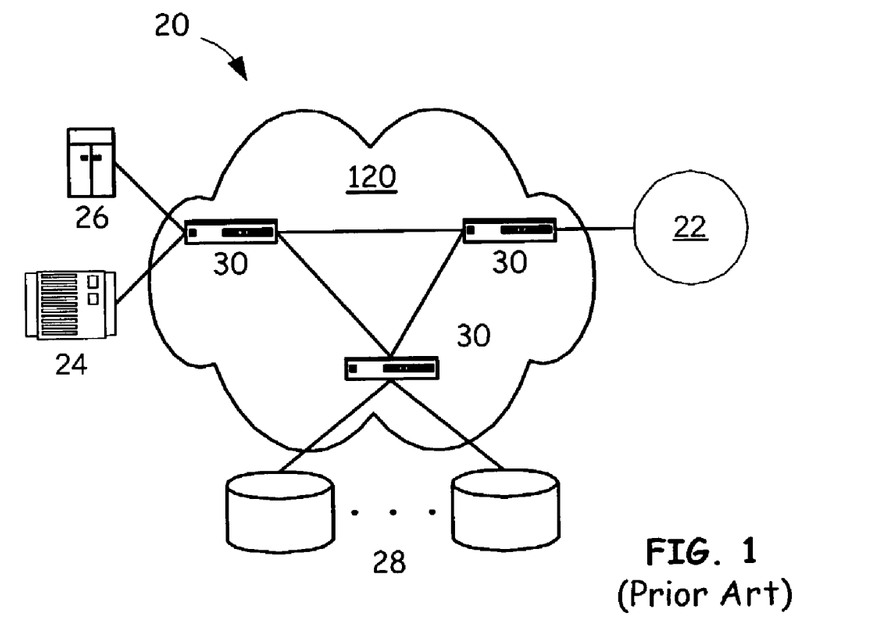
FIG. 1 is a block diagram of a typical fabric with connecting devices.

FIG. 1 depicts a typical Storage Area Network (SAN) 20 utilizing a Fibre Channel network. A fabric 32 may comprise one or more switches 30. Three switches 30 are shown. Many devices or nodes, such as a general storage device 24, a server 26, database storage devices 28 and a loop 22 (itself comprised of devices, not shown) are connected to the fabric 32. Any devices on the fabric 32 can communicate to any other devices on the fabric 32.

Figure 2:
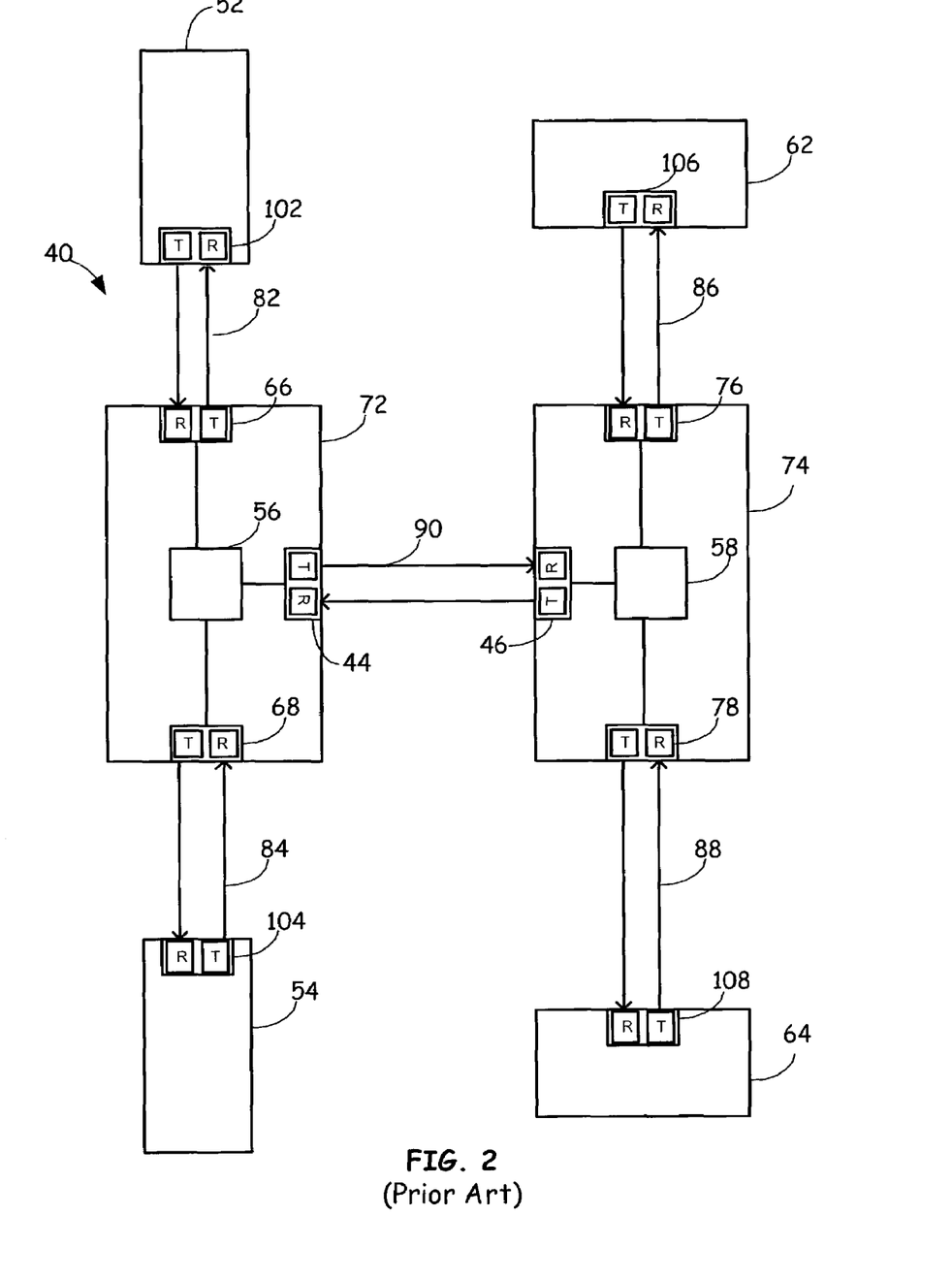
FIG. 2 is a block diagram of two-switch, four-device network showing the interconnections.

FIG. 2 is a block diagram showing more details of several particular interconnections in a portion of a SAN 40. Two switches 72 and 74 are shown, together with two servers 52, 54 and two storage devices 62, 64. The N-ports 102, 104, 106 and 108 on storage devices 52 and 54, and servers 62 and 64, and their corresponding F-ports 66, 68, 76 and 78 on the switches 72 and 74 are linked by links 82, 84, 86 and 88. The two switches 72 and 74 have one E-port each, 44 and 46, which are connected through ISL 90. Each switch may also have a central memory 56 and 58 in switches 72 and 74, for buffering information in transit and a control module (not shown) for managing the information flow, such as directing flows of information and managing the buffer space. Each port has a transmitter (T) and a receiver (R). The available buffer spaces in the central memory are allocated among the ports on the switch. The operation of the buffer-to-buffer credit which represents the buffer space is as described above. As above, the transmitter can only send a frame when it has at least one credit for the VC of the frame. When the credits run out, the transmitter has to wait for the credits to be returned by the receiving port on the other end of the link.

Figure 3:
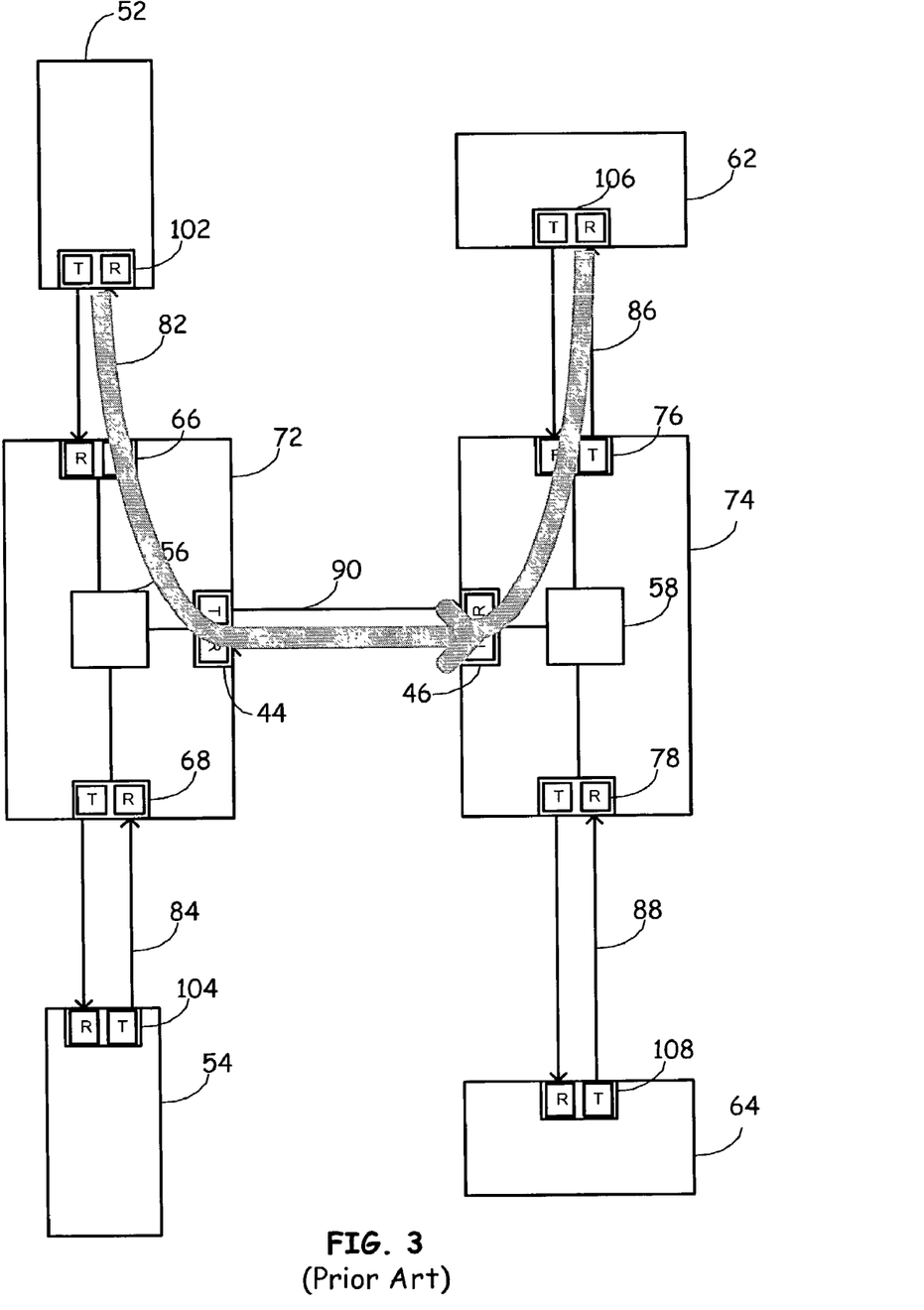
FIG. 3 is a block diagram of the prior art showing communicating paths between devices across an ISL where one communication path blocks all other communications.

When more than one pair of devices is connected through a common ISL, conflict may arise as shown in FIG. 3. In the simplest example of the problem, in Class 1 operation, when a first pair of devices 52 and 62 establishes a connection 82, 86 and through ISL 90 in the middle, no other devices can use the ISL 90. A second pair of devices 64 and 54 cannot communicate to each other even though both of them are free and ready to communicate, because the ISL 90 is not available. In the much more common Class 2 or 3 operations, similar blockages may also happen. When a first pair of devices uses up all the credits or other resources of the ISL 90, then other pairs have to wait until the credits are returned from the receiving device, which can then be used by the other pairs. So in class 2 or 3 operation the blockage occurs due to credit hogging on the ISL, as opposed to the more easily visualized class 1 link availability hogging. But the end result is the same: one pair of devices hogs the ISL at the expense of the other device pairs.

Figure 4:
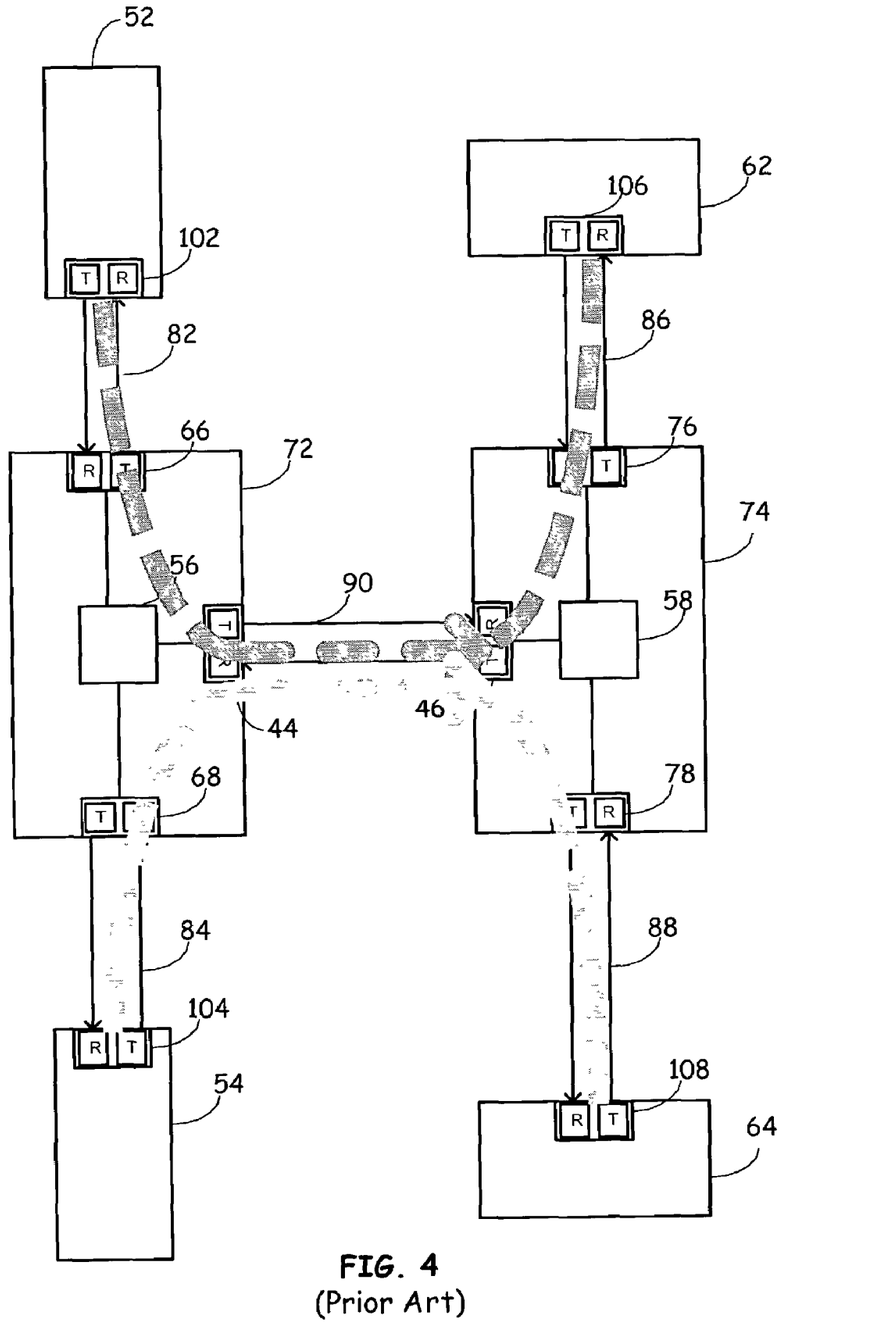
FIG. 4 is a block diagram of the prior art showing the communicating paths across an ISL with time multiplex or virtual channels where more than one communication paths can be maintained.

Time multiplexing has been used to avoid such blocking, as showing in FIG. 4. The frames may be segregated into separate frame flows or virtual channels with a priority scheme. As described above, on a single ISL, there may be several virtual channels with each virtual channel having its own priority level and queuing mechanism. A single ISL has two directional information flow paths. Each flow path can be operated independently but in the same fashion. Discussion of one information flow path is sufficient. A flow path is a path where data frames transfer from the transmitter on one E-port to the receiver on the other E-port of the ISL.

As also described above, the credits are allocated to each virtual channel, such that each virtual channel operates as a real link. When there are credits available, the virtual channel can send frames. When the allocated credits are used up, the virtual channel has to wait until a credit is returned by the receiving port on the other end of the link.

Figure 5:
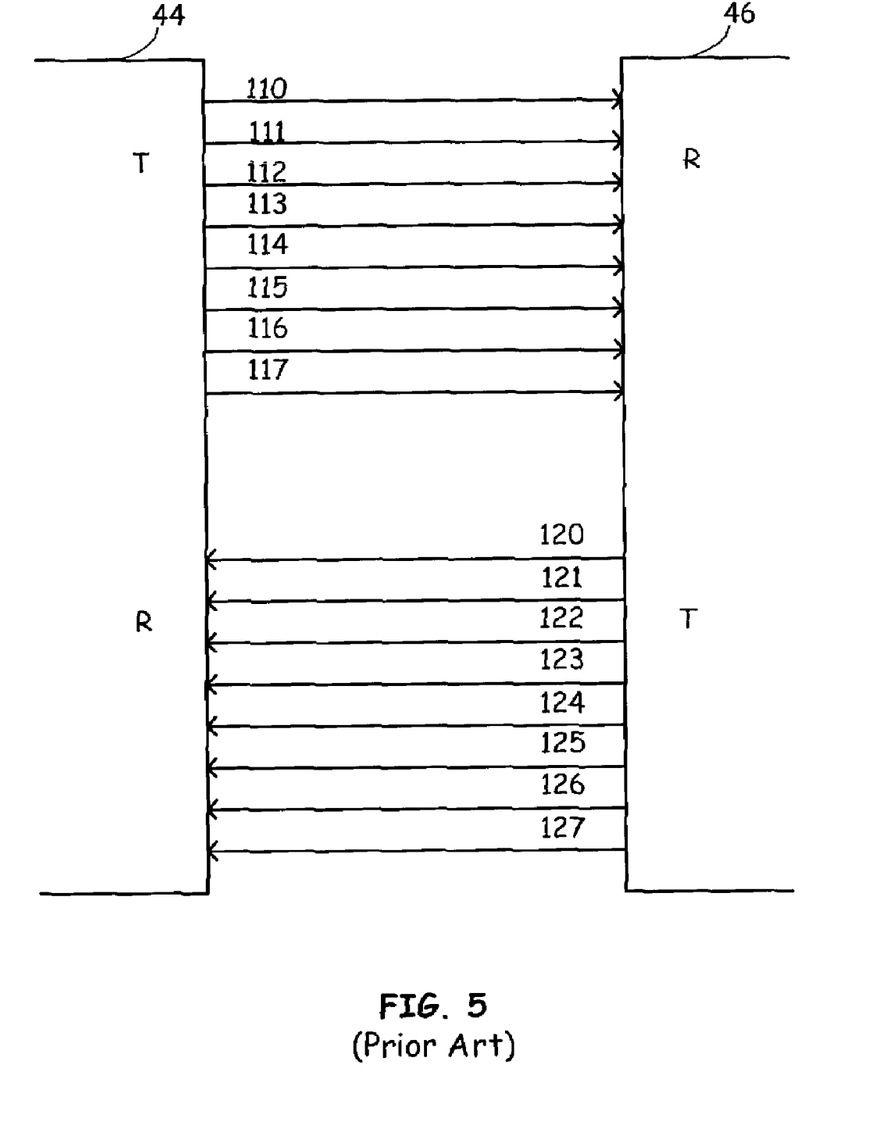
FIG. 5 is a block diagram of the prior art showing virtual channels between two E-ports.

FIG. 5 shows one prior art implementation of the virtual channel (VC) in a switch. There is one ISL between E-ports 44 and 46. The ISL is divided into eight (8) virtual channels, VC0, 1, 2, 3, 4, 5, 6 and 7. On the transmitter of E-port 44, they are represented as channels 110 through 117 and on the transmitter of E-port 46, they are similarly represented as channels 120 through 127. In this prior art example, each port on the switch was allocated 28 credits. Each VC then has its own priority, its own credits and flow control. In the prior art implementation, the VCs were assigned as the following:

VC0 was for inter-switch traffic, Class F;

VC1 could be used for carrying Class 2 F_BSY and F_RJT frames generated by a fabric element;

VC2 through VC5 were four unicast data carrying virtual channels; and

VC6 and VC7 were used for data frames for multicast and broadcast traffic only.

The credits were allocated to virtual channels according to the following: (1, 1, 6, 6, 6, 1, 1), for VC0 through VC7, assuming the total number of credits is 28. The virtual channels VC2-5 needed more credits because they carried most of the data transfer traffic.

The assignments of VC2-5 to a particular port connected to a switch may be determined by various methods or factors. The major factors are the frame SID and DID and the routing functions. The actual assignment of VCs to physical ports servicing the data transmission is outside the scope of the present invention but the following assignment will be used as an example. Each switch has number 0 through number 7 physical ports. The number 0 port is the E-port of the ISL in the following discussion. For simplicity and clarity of the discussion of the present invention, the VC assignment may be determined by a predetermined routing table as in Table 1.

TABLE 1

A simple Routing Table

| F-port, DID | Assigned Virtual Channel |
|---|---|
| 0 (the E-port on ISL) | |
| 1 | VC2 |
| 2 | VC2 |
| 3 | VC3 |
| 4 | VC3 |
| 5 | VC4 |
| 6 | VC4 |
| 7 | VC5 |

One drawback of this prior art scheme is that the credits assigned to each virtual channel are fixed. However, in an actual fabric, frequently, not all ports are connected to devices, so some of the virtual channels used for "connecting" those physical ports will not be utilized. The credits allocated to those VCs not in use are wasted, while other virtual channels in use may not have enough credits to achieve the full transmission speed.

Figure 6A:
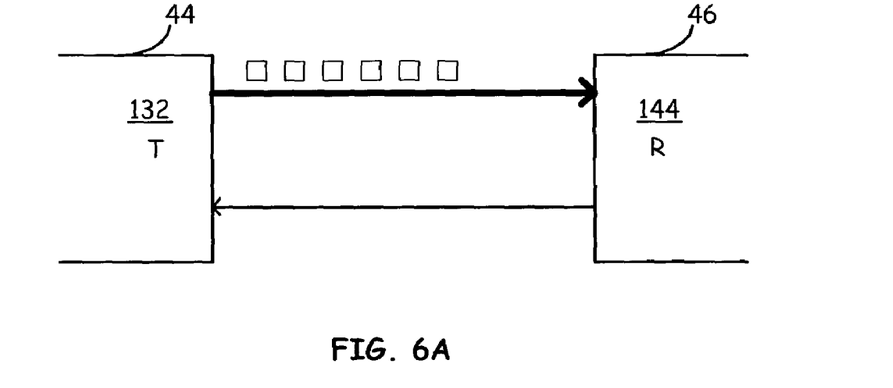
FIGS. 6A-C are block diagrams showing virtual channels between two E-ports and the transmitting of frames, waiting and receiving credits of a transmitter.
Figure 6B:
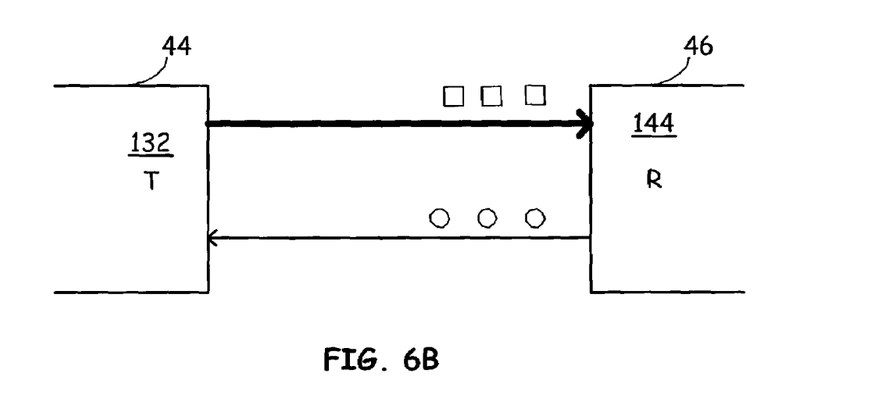
Figure 6C:
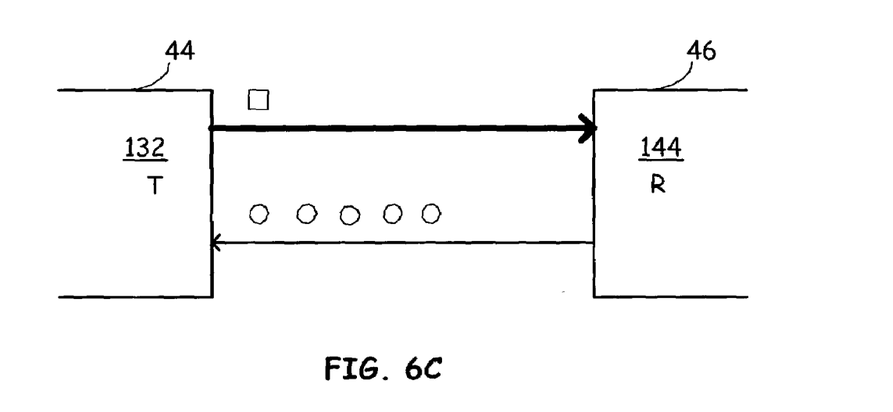
Figure 7A:
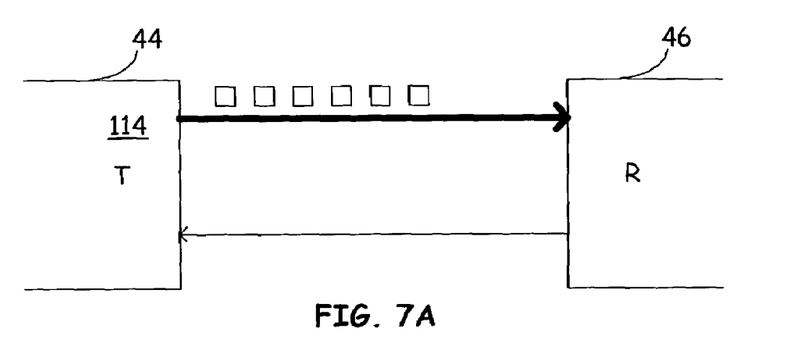
FIGS. 7A-D are block diagrams showing a virtual channel between two E-ports transmitting of frames, and receiving credits of a transmitter.
Figure 7B:
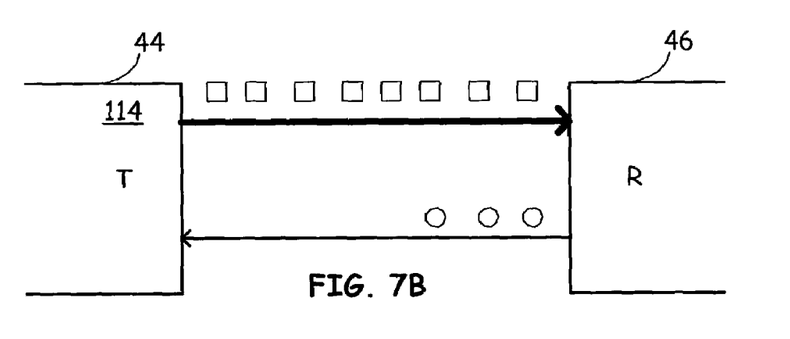
Figure 7C:
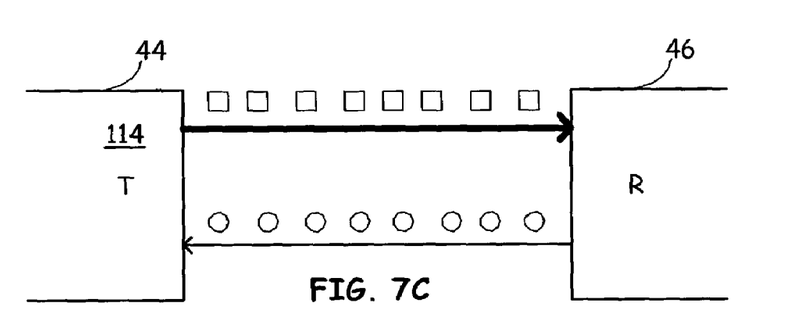
Figure 7D:
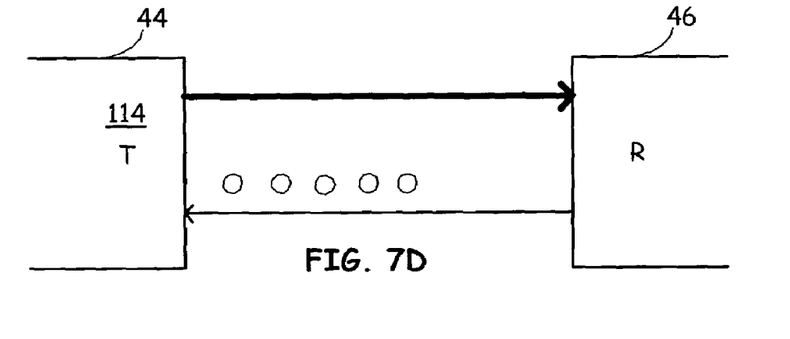

FIGS. 6A-C illustrate another drawback of prior art VCs with fixed number of credits for each VC, as described in the background. Using the same example just above, the total credits of the ISL are 28 credits. Each of the unicast data frame carrying VCs has 6 credits. In a long haul or long distance scenario, assume that during the time a frame travels from transmitting port 132 to a receiving port 144, the transmitter can send out 8 frames. In FIG. 6A, the transmitting port 132 can send out six (6) frames without waiting. After the transmitter in the transmitting port 132 sends out six (6) frames, the transmitter runs out of credits and has to stop. All the six frames are still in the ISL. After two more credit time periods, the first frame reaches the receiving port 144. After receiving frames from the ISL, the receiving port 144, through a transmitter on the same receiving port, starts returning credit to the transmitting port 132, through a receiver on the same transmitting port 132, while the transmitter on the transmitting port 132 is still waiting, as shown in FIG. 6B. Assuming the turn-around time within the receiving port, which is time between the receiving port 144 receives a frame until the transmitter on the same receiving port 144 sends out a credit, is negligible. After sixteen (16) credit time periods, the first credit reaches the transmitting port 132, as shown in FIG. 6C. Then the transmitting port 132 can send more frames to the receiver again. During the sixteen (16) credit time periods, the transmitter is sending frames during only six (6) credit time periods, the same number of credits as the transmitter has. That is $6/16$, or less than 40% of the bandwidth being utilized.

Continuing using the similar numbers, the following example illustrates the situation where a VC level credit pooling is used. Still assuming that the total credits of the ISL are 28 credits. Instead of allocating all credits to all VCs, about half of the total credits are reserved in a VC pool, and half of the credits are advertised to a transmitting port for each individual VCs, i.e. (1, 1, 3, 3, 3, 3, 1, 1), or 16 credits for the eight VCs, and 12 credits are reserved in a pool. So when the VC level pool is used, only 16 credits, out of 28 credits are advertised. Even though the receiving port now has a large pool of credits from which it can borrow credits, i.e. the receiving port can return a credit as soon as a frame reaches the receiving port, without waiting for the frame to be cleared out of its buffer, the receiving port still cannot return a credit before the transmitting port sends out a frame. If only VC2 is in use, then the transmitting port has to stop after sending out 3 frames. The receiving port with its large pool of credits cannot do anything until the receiving port receives the first frame, about 8 credit time periods later. It may still take another 8 credit time periods for first returned credit to reach the transmitting port. During the 16 credit time periods, the transmitting port can send only 3 frames for VC2, i.e. $3/16$ or less than 20% of the bandwidth of the ISL is used.

If the VC has sixteen (16) credits instead of six (6) or three (3), then the transmitter can send sixteen (16) frames before it needs credits back from the receiver to continue sending frames. Because it takes 16 credit time periods for the first returned credit to reach the transmitter, by the time the transmitter finishes sending out the $16^{th}$ frame, the first credit should arrive at the transmitter. With that credit, the transmitter can send out another frame. This will establish a steady state, where the transmitter receives a credit and sends out a frame. There is no extra credit on the transmitter, but there is no waiting for credit either. So the transmitter can fully utilize the bandwidth on the ISL. If the VC has more than sixteen (16) credits, then there will be some extra or reserve credits on the transmitter as an additional buffer in case there is glitch on the credit return, or if the frames are not all full size. As a note, it is understood that frame sizes can vary and that may change specific examples given, but for purposes of the explanations, full size frames have been used in the examples. Thus, if the frame size were smaller, the credit problem would worsen.

It is now apparent that the amount of credits available for a VC can have a direct impact on the effective transmission speed, or the bandwidth utilization of the ISL. The VCs may solve the blockage problem, traffic congestion problem etc, but they may cause the under-utilization of the available bandwidth in an ISL.

One of the embodiments of the current invention advantageously fully utilizes the available bandwidth, while avoiding the blockage problem. In one embodiment according to the current invention, the virtual channels are assigned minimum credits initially, such as 0, 1 or a predetermined minimum, and the remaining credits in the port are assigned to a common virtual channel pool for the port. Since the virtual channels are not identical, the minimum credits for one VC may be different from the minimum credits for another VC, depending on the type of the VC. The credits in the VC pool are then allocated to the virtual channels that are actually in use according to certain criteria or formula. For example, the numbers of credits can be allocated to maximize the total throughput of the transmission through the ISL. Another example may be that the numbers of credits are allocated to make all VCs in use having the same throughput, so as not to shut out or severely penalize the VCs servicing slow physical links.

In one embodiment of the current invention, the credit allocation to VCs is dynamic, so it is necessary to have a manager to control or manage the credit allocation. Since the transmitter knows how many frames are waiting to be transmitted for each VC at any given point in time, it is better to have the transmitter manage the credit allocation. In this embodiment, when two E-ports are connected and negotiate the initial configuration, the transmitters negotiate and acquire the control of VC credit allocation, while the receivers advertise the total credits available for the whole port, rather than for each individual VC. Once the transmitter acquires the control of the VC credit allocation, it will divide the ISL into several VCs and assign the initial minimum credit allocation to each VC.

The following illustrative examples will exemplify this embodiment according to the current invention. For ease of comparison with the prior art virtual channel implementation, still assume that there are eight (8) VCs in the transmitter of an E-port and that the total credits of the E-port is 28. So the initial credits allocation by the transmitter may be: (1, 1, 1, 1, 1, 1, 1, 1) in VC0-7, with 20 in the pool.

FIGS. 7A-7D illustrate a similar situation as in FIGS. 6A-6C, except having the embodiment of the current invention. In this embodiment, the transmitter controls the allocation of the credits to each VC. The initial allocation is (1, 1, 1, 1, 1, 1, 1, 1) in VC0-7, with 20 in the pool. Assume that only one frame carrying VC, e.g. VC4 is in use. So the transmitter could allocate one or more of the credits in the pool to VC4, i.e. (1, 1, 1, 1, 21, 1, 1, 1) in VC0-7 and 0 in the pool. VC4 has 21 credits, more than the 16 credits needed to achieve the full speed. After the transmitter fills up the pipe line with 8 frames and 8 credits, the transmitter has 5 credits in its reserve. The transmitter can continuously send frames to the receiver without any waiting for return credits.

Figure 8A:
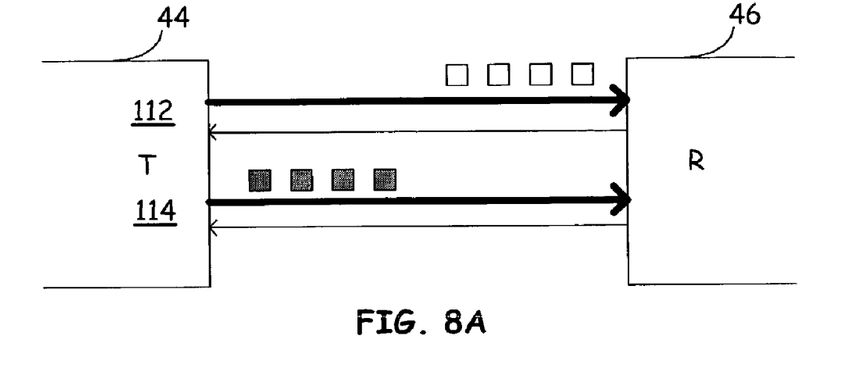
FIGS. 8A-C are block diagrams showing two virtual channels using the ISL.
Figure 8B:
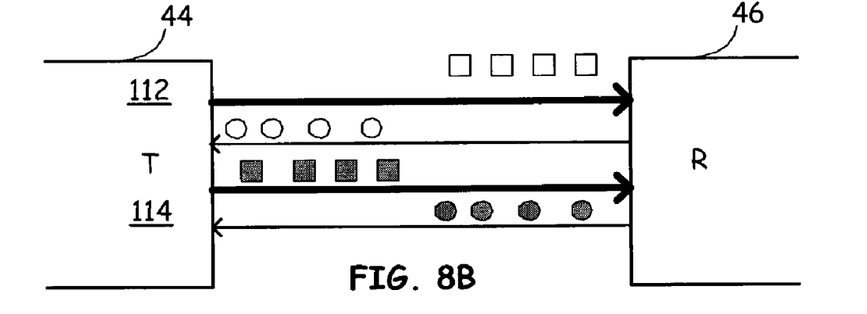
Figure 8C:
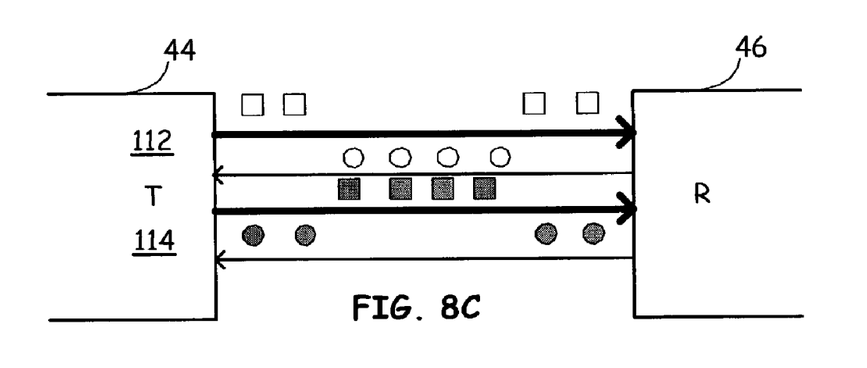

In a second scenario, as shown in FIGS. 8A-C, VC2 is used by a link to a device 64. Two frame-carrying VCs are in use. The transmitter may alter the credit allocation to (1, 1, 11, 1, 11, 1, 1, 1) in VC0-7 and 0 in the pool. There will be 22 credits available to VC2 and VC4 and they may send 16 out of 22 frames between VC2 and VC4 to fill up the ISL to achieve a steady state. During the steady state, the ISL is fully loaded and running at its full speed. Depending on the VC setup, VC2 and VC4 may alternate sending frames through the shared ISL. As the example shown in FIG. 8A, VC2 sends 4 frames with 7 credits left, then VC4 sends 4 frames with 7 credits left. The first frame reaches the receiver and then the receiver, through a transmitter on the receiving port, starts to return credits. VC2 sends 4 more frames, with 3 credits left; and VC4 sends 4 more frames with 3 credits left. At this time, the first credit reaches the transmitting port and returns to VC2, as in FIG. 8B. After this time, for every frame sent out, there is credit returned. A steady state is achieved, as in FIG. 8C. Both VC2 and VC4 are using the ISL. There is no blockage. The ISL is at the full speed. There is no reduction of bandwidth utilization.

The transmitter knows if there are frames in a queue in a particular VC waiting for transmission. Once the queue for a VC is clear, the transmitter can reallocate the credits for the VC to other VCs in need or back to the pool. Since there is a minimum number of credits for each VC initially, even before the transmitter allocates more credits to a particular VC, any VC is not completely shut out of using the ISL, unless, of course, if its minimum value is zero. The credit allocation or reallocation is carried out by the transmitter dynamically when the credits are returned from the receiving port. Whenever the need of credits for all the VCs in use changes, the transmitter can allocate the returned credits from the receiving port to the VC in need, according to a predetermined formula, such as maximum throughput through the ISL or uniform throughput through each VC in use.

In another embodiment of the present invention, the allocation or reallocation of credits may be completely and continuously dynamic. After the initial minimum credits allocation for each VC, all the remaining credits are allocated to the VC level pool. All the returned credits from the receiving port are also reserved into the pool, except that the minimum number of credits for each VC is maintained first. The transmitting port control module allocates each and every credit from the pool to a VC in use and in need credit by credit, frame by frame. Regardless how many VCs are in use, all of the credits in a receiving port will be advertised to the transmitting port. All the credit advertised to the transmitting port will be allocated by the transmitting port, i.e. all the credits minus the minimum credits for each VC, which could be zero, are allocated to the pool. When a frame needs to be transmitted through a particular VC, the transmitting port control module may allocate one credit from the pool to that particular VC for transmitting that particular frame. Since the transmitting port "knows" where each frame goes through which VC, the transmitting port may assign a priority to only the VCs that are in use, i.e. the VCs that have frames to send. Each VC may be assigned a priority by the control module through a predetermined priority scheme, such as round-robin, so that no one VC in use will be shut out. Since VCs not in use have no frames to send, VCs not in use do not participate in the priority scheme. VCs not in use cannot waste credits that they do not need. In this embodiment, essentially a frame level credit allocation, all of the credits are utilized, so that the bandwidth of the ISL may be utilized to the maximum. The number of VCs in use is irrelevant in this embodiment.

This continuous credit allocation scheme may be illustrated by the following numeric example using similar numbers as above. Initially, the credit allocation may be (0, 0, 0, 0, 0, 0, 0, 0) and 28 in the pool. Here the minimum number of credits has been selected to be zero. If there are frames needed to be sent through VC2, then for each frame, a credit is taken from the pool and assigned to VC2, so that VC2 can send the frame. After 16 frames are sent by VC2, the credit allocation becomes (0, 0, 16, 0, 0, 0, 0, 0) and 12 in the pool. When a credit received by the transmitting port, as would be the case in this example with VC2 having sent 16 frames, the credit is returned to the pool and the credits allocated to VC2 decreased by one. If more frames need to be sent through VC2, then more credits are allocated to VC2, one by one. So, using the values in the examples, the allocation would stabilize at VC2 having 16 credits. If besides frames for VC2, there are frames for VC3, then credits allocation may be alternated between VC2 and VC3 when round-robin priority scheme is used, i.e. one credit for VC2, then one for VC3, then one for VC2, one for VC3, and so on. The credit allocation, frames and credits in transit may become: (0, 0, 8, 8, 0, 0, 0, 0) and 12 in the pool. If besides frames for VC2 and VC3, there are frames for VC4, then credit allocation may be alternated among VC2, VC3 and VC4, i.e. one credit for VC2, one for VC3, one for VC4, and so on. The credit allocation and frames and credits in transit may be: (0, 0, 6, 5, 5, 0, 0, 0) and 12 in the pool.

Embodiments according to the present invention make the allocation of buffer credits in a Fibre Channel dynamically based on the need of each virtual channel in use, rather than statically based on the total number of virtual channels in an ISL. This operation is applicable regardless of the ways the virtual channels are assigned in respect to the physical port connections. The particular way of assigning a virtual channel to service a particular physical communication path is immaterial to the present invention.

The present invention may be implemented in many ways. For example, the present invention may be implemented in a software format, as a machine readable, machine executable program. The software program executing the present invention can be loaded into a processor or control module on a switch, or a buffer credit management module on a switch, during a power up initialization or a later set-up. This presumes that the hardware portions of the buffer credit logic are sufficiently programmable or are made sufficiently programmable to handle the changing credit allocations per VC.

The present invention may also be implemented in hardware format, as a new switch having the new credit sharing scheme built into the hardware.

While illustrative embodiments of the invention have been illustrated and described, it will be appreciated that various changes can be made therein without departing from the spirit and scope of the invention.

Titles and subtitles used in the text are intended only as focal points and an organization tool. These titles are not intended to specifically describe the applicable discussion or imply any limitation of that discussion.

The invention claimed is:

1. A method for managing credits in a Fibre Channel network having at least first and second devices linked by a port on each of said two devices, wherein a transmitter is on said first device and a receiver is on said second device, wherein on said second device, said receiver has control of a plurality of buffers and a plurality of credits representing said buffers, the method comprising the steps of:
   providing the control of the allocation of said credits to said transmitter;
   dividing said link into a plurality of virtual channels;
   allocating each virtual channel a minimum number of credits from said credits;
   reserving the remaining credits to a pool;
   allocating at least one credit in the pool to one virtual channel in use; and
   allocating one credit in the pool to a virtual channel through which a next frame is transmitted by the first device, wherein the next frame is determined by a priority scheme.

2. The method in claim 1,
   wherein the minimum number of credits for each virtual channel is greater than or equal to zero.

3. The method in claim 1 further comprising a step of:
   reallocating the credits in the pool to a virtual channel in use when the need of any virtual channel in use changes.

4. The method in claim 1 further comprising a step of:
reallocating the credits in the pool to a virtual channel in use when a network device is connected to or disconnected from one of said first and second devices.

5. The method in claim 1,
wherein the priority scheme is round-robin.

6. The method in claim 1, where the allocated credits to virtual channels in use are allocated to these virtual channels to maximize the throughput of said inter-switch link.

7. The method in claim 1, where the allocated credits to virtual channels in use are allocated such that each virtual channel in use has a uniform throughput.

8. The method in claim 1, where the plurality of virtual channels has at least three virtual channels, one virtual channel for transmitting control instructions, one virtual channel for transmitting data frames and one virtual channel for transmitting multicast data frames.

9. The method in claim 1, where the plurality of virtual channels has at least two virtual channels for transmitting data frames.

10. The method in claim 1, where the minimum number of credits allocated to a virtual channel that carries frames when in use is one.

11. The method in claim 1, further comprising a step of:
allocating a returned credit to the pool, wherein the returned credit is returned from the second device to the first device.

12. A device for a Fibre Channel information network comprising:
a transmitter for connecting to a receiver and wherein the transmitter includes a plurality of virtual channels for communicating with the receiver; and
a buffer management module communicating with the transmitter,
wherein the buffer management module acknowledges the credits advertised by the receiver, and
wherein the buffer management module further takes control of the allocation of the credits advertised by the receiver,
allocates a minimum number of credits from the credits advertised by the receiver to each virtual channel and allocates the remaining credits in a credit pool, and
allocates at least one credit from the credit pool to at least one virtual channel in use.

13. A device in claim 12,
wherein the minimum number of credits is greater than or equal to zero.

14. A device for a Fibre Channel information network, the device comprising:
a receiver for connecting to a transmitter on a second device and wherein the transmitter includes a plurality of virtual channels for communicating with the said device;
a memory communicating with the receiver, where the memory includes a plurality of buffers;
a buffer management module communicating with the memory and the receiver,
wherein the buffer management module allocates a plurality of buffers and a plurality of credits representing the buffers to the receiver;
wherein when the receiver is connected to the transmitter on the second device, the buffer management module advertises to the transmitter on the second device the plurality of credits,
wherein the buffer management module acknowledges the control of the allocation of the plurality credits by the transmitter on the second device if requested by the transmitter on the second device.

15. The device as in claim 14, further comprising:
one or more receivers,
wherein the memory is a centralized memory, utilized by all the receivers.

16. The device as in claim 14, further comprising:
one or more receivers,
wherein each receiver has a dedicated memory.

17. A Fibre Channel switch for an information network, said switch comprising:
a first port and a second port, wherein the first port has a transmitter for connecting to a receiver on a second switch, and wherein the transmitter includes a plurality of virtual channels for communicating with the second switch;
a buffer management module connected to the first port,
wherein the buffer management module acknowledges the credits advertised by the receiver on the second switch,
wherein the buffer management module takes control of the allocation of the credits advertised by the receiver on the second switch,
allocates a minimum number of credits from the credits advertised by the receiver on the second switch to each virtual channel and allocates the remaining credits in a credit pool, and
allocates at least one credit from the credit pool to at least one virtual channel in use.

18. The Fibre Channel switch in claim 17, wherein the virtual channels in the transmitter have at least three virtual channels, one virtual channel for transmitting control instructions, one virtual channel for transmitting unicast data frames and one virtual channel for transmitting multicast data frames.

19. The Fibre Channel switch in claim 17, wherein the virtual channels in the transmitter have at least two virtual channels for transmitting unicast data frames.

20. The Fibre Channel switch in claim 17, wherein the buffer management module further allocates the credits in the credit pool to all virtual channels in use in the transmitter to maximize the throughput through the first port.

21. The Fibre Channel switch in claim 17, wherein the buffer management module further allocates the credits in the pool to all virtual channels in use in the transmitter to achieve a uniform throughput in all virtual channels in use in the transmitter.

22. A Fibre Channel switch for an information network, said switch comprising:
a first port and a second port, wherein the first port has a first port receiver for connecting to a transmitter on a second switch and wherein the first port receiver includes a plurality of virtual channels for communicating with the second switch;
a memory communicating with the first port, where the memory includes a plurality of buffers;
a buffer management module communicating with the memory and the first port,
wherein the buffer management module allocates a plurality of buffers and a plurality of credits representing the buffers to the first port receiver;
wherein when said switch is connected to the second switch, the buffer management module advertise to the transmitter on the second switch the plurality of credits,
wherein the buffer management module acknowledges the control of the allocation of the plurality credits by the transmitter on the second switch if requested by the transmitter on the second switch.

23. The Fibre Channel switch in claim 22, wherein the first port further has a first port transmitter for connecting to a receiver on the second switch
wherein the first port transmitter includes a plurality of virtual channels;
wherein the buffer management module acknowledges the credits advertised by the receiver on the second switch, and
wherein the buffer management module takes control of the allocation of the credits advertised by the receiver on the second switch,
allocates a minimum number of credits to each virtual channel and allocates the remaining credits in a pool, and
allocates at least one credit from the pool to at least one virtual channel in use.

24. A Fibre Channel network comprising:
a first switch including:
a first port having a transmitter; and
a first buffer management module communicating with the first port; and
a second switch including:
a second port having a receiver and connecting to the first switch through an inter-switch link between the first port transmitter and the second port receiver;
a memory communicating with the second port and having a plurality of buffers; and
a second buffer management module communicating with the memory,
wherein a plurality of buffers from the second switch memory and a plurality of credits representing the plurality of buffers are allocated to the second port receiver by the second buffer management module,
wherein the inter-switch link includes a first number of virtual channels,
wherein the first buffer management module controls the allocation of the plurality of credits allocated to the second port receiver,
wherein the first buffer management module allocates each virtual channel a minimum number of credits from the plurality of credits,
wherein the first buffer management module allocates the remaining credits to a pool, and
wherein the first buffer management module allocates at least one credit from the pool to a virtual channel in use.

25. The Fibre Channel network in claim 24, wherein the minimum number of credits allocated to a virtual channel is greater than or equal to zero.

26. The Fibre Channel network in claim 24,
wherein the first switch further has a memory communicating with the first port, the memory having a plurality of buffers,
wherein the first port further has a receiver,
wherein a plurality of buffers from the first switch memory and a plurality of credits representing the plurality of buffers are allocated by the first buffer management module to the first port receiver,
wherein the second port has a transmitter and connects to the first port receiver through an inter-switch link which includes a second number of virtual channels,
wherein the second buffer management module controls the allocation of the plurality of credits allocated to the first port receiver among the second number of virtual channels,
wherein the second buffer management module allocates each virtual channel among the second number of virtual channels a minimum number of credits from the plurality of credits allocated to the first port receiver,
wherein the second buffer management module allocates the remaining credits to a second pool, and
wherein the second buffer management module allocates at least one credit from the second pool to a virtual channel in use among the second number of virtual channels.

27. A Fibre Channel network system comprising:
a first node;
a second node;
a first switch including:
a first port connected to said first node;
a second port having a transmitter; and
a first buffer management module connecting to the first port and the second port; and
a second switch including:
a third port having a receiver and connecting to the first switch through an inter-switch link between the second port and the third port;
a fourth port connected to said second node;
memory communicating with the third and fourth ports, having a plurality of buffers; and
a second buffer management module connecting to the second memory,
wherein a plurality of buffers from the second switch memory and a plurality of credit representing the plurality of buffers are allocated by the second buffer management module to the third port receiver,
wherein the inter-switch link includes a plurality of virtual channels,
wherein the first buffer management module controls the allocation of the plurality of credits,
wherein the first buffer management module allocates each virtual channel a minimum number of credits from the plurality of credits,
wherein the first buffer management module allocates the remaining credits to a pool, and
wherein the first buffer management module allocates at least one credit from the pool to a virtual channel in use.

28. The Fibre Channel network system in claim 27, wherein the first node is a server.

29. The Fibre Channel network system in claim 27, wherein the first node is a storage unit.

30. The Fibre Channel network system in claim 27, wherein the second node is a server.

31. The Fibre Channel network system in claim 27, wherein the second node is a storage unit.

* * * * *